(12) United States Patent
Cheong et al.

(10) Patent No.: US 6,724,168 B2
(45) Date of Patent: Apr. 20, 2004

(54) APPARATUS AND METHOD FOR CONTROLLING ROTATION SPEED OF SYNCHRONOUS RELUCTANCE MOTOR

(75) Inventors: Dal-Ho Cheong, Seoul (KR); Jae-Yoon Oh, Seoul (KR); Kyung-Hoon Lee, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 10/170,541

(22) Filed: Jun. 14, 2002

(65) Prior Publication Data

US 2003/0015987 A1 Jan. 23, 2003

(30) Foreign Application Priority Data

Jul. 10, 2001 (KR) .......................... 2001-41275

(51) Int. Cl.[7] .............................................. H02P 5/28
(52) U.S. Cl. ........................................ 318/701; 318/700
(58) Field of Search .................................. 318/700, 701

(56) References Cited

U.S. PATENT DOCUMENTS

| | | | |
|---|---|---|---|
| 5,565,752 A | 10/1996 | Jansen et al. | |
| 5,585,709 A | 12/1996 | Jansen et al. | |
| 5,821,727 A | 10/1998 | Yura | |
| 6,163,127 A | * 12/2000 | Patel et al. | 318/700 |
| 6,339,308 B2 | * 1/2002 | Shinnaka | 318/701 |
| 6,555,988 B2 | * 4/2003 | Masaki et al. | 318/721 |

FOREIGN PATENT DOCUMENTS

JP   10146100 A   * 5/1998   .......... H02P/21/00

* cited by examiner

Primary Examiner—Robert Nappi
Assistant Examiner—Patrick Miller
(74) Attorney, Agent, or Firm—Birch, Stewart, Kolasch & Birch, LLP

(57) ABSTRACT

An apparatus is provided for controlling rotation speed of a synchronous reluctance motor, including a position estimation unit for controlling rotation speed of the synchronous reluctance motor by estimating the position angle of the rotor and rotation speed of the rotor according to the low speed or high speed region. The apparatus can control the motor in the high speed area or low speed area, stabilize the transient state generated in the process that the motor is converted from the low speed area to the high speed area and show stable speed control performance, thus performing more precise speed control.

23 Claims, 3 Drawing Sheets

APPARATUS AND METHOD FOR CONTROLLING ROTATION SPEED OF SYNCHRONOUS RELUCTANCE MOTOR

BACKGROUND OF THE INVENTION

1. Field of the Invention

The present invention relates to an apparatus for controlling rotation speed of a synchronous reluctance motor and particularly, to an apparatus for controlling rotation speed of a synchronous reluctance motor capable of controlling rotation speed and torque of a motor by detecting input voltage and input current of a synchronous reluctance motor and estimating speed and position angle of a rotor, without using a sensor for detecting rotor position.

2. Description of the Background Art

Generally, for a conventional apparatus for controlling rotation speed of a synchronous reluctance motor, information of speed or flux of a motor is necessary in case of performing an instantaneous torque control and accordingly, sensors such as a tachometer, generator, resolver or pulse encoder to abstract the information of speed or flux of a motor.

However, since it is difficult to handle the above sensors, the sensors are very sensitive to noise and increase cost, recently, much research about sensorless vector control methods capable of controlling speed and torque without revising the speed according to the second resistance change of a motor has been conducted actively in overseas advanced enterprises. been conducted actively in overseas advanced enterprises.

FIG. 1 is a block diagram showing structure of a conventional apparatus for controlling rotation speed of a synchronous reluctance motor and as shown in the drawing, the conventional apparatus for controlling rotation speed of a synchronous reluctance motor includes a first comparator 11 for outputting speed error after comparing a speed reference value $\omega_r^*$ and real rotor speed value $\omega_r$, a speed control unit 12 for outputting electric current $i_{qs}^*$ for reference torque after performing PI control for compensating the outputted speed error, a second comparator 13 for outputting current error after comparing the current for reference torque $i_{qs}^*$ and current for real torque $i_{qs}$, a flux reference generation unit 14 for referring the flux and outputting flux reference value $\lambda_d^*$ according to the real speed $\omega_r$, a flux control unit 15 for outputting a current for reference flux $i_{ds}^*$ after performing PI control receiving the above outputted flux reference value $\lambda_d^*$, a third comparator 16 for outputting a corresponding current error by comparing the electric current for the reference flux $i_{ds}^*$ and current for real flux $i_{ds}$, a current control unit 17 for outputting voltage $V_{ds}^*$ for reference flux and voltage $V_{qs}^*$ for reference torque according to an output current of the second comparator 13 and third comparator 16, a three phase voltage generation unit 18 for receiving the voltage $V_{ds}^*$ for reference flux, voltage $V_{qs}^*$ for reference torque and the real position angle of the rotor θ from the integrator 22, converting into three phase voltages Vas, Vbs and Vcs of the fixed coordinate system and outputting the voltages, an inverter unit 19 for rotating the synchronous reluctance motor 20 by applying the three phase voltages Vas, Vbs and Vcs of the three phase voltage generation unit 18, a rotor position detection unit 21 for yielding the real speed by detecting rotation speed of the synchronous reluctance motor, an integrator 22 for yielding the real position angle of the rotor by integrating the real speed $\omega_r$, and a coordinate conversion unit 23 for receiving the two phase electric currents ias and ics detected in rotating the synchronous reluctance motor 20, converting the currents into the current $i_{ds}$ for real flux and current $i_{qs}$ for real torque and outputting the converted currents.

Here, operation principle of the conventional apparatus for controlling rotation speed of a synchronous reluctance motor with reference to the accompanied drawings is as follows.

First, the first comparator 11 outputs speed error to the speed control unit 12 after comparing a speed reference value $\omega_r^*$ and real rotor speed value $\omega_r$ detected from the rotor position detection unit 18 in rotating the synchronous reluctance motor 17. Then, the speed control unit 12 outputs electric current $i_{qs}^*$ for reference torque after performing PI control for compensating the outputted speed error.

On the other hand, the flux reference generation unit 14 generates and outputs the flux reference value $\lambda_d^*$ to the flux control unit 15 and the flux control unit 15 outputs the current $i_{ds}^*$ for reference flux to third comparator 16 after performing PI control by receiving the above outputted flux reference value $\lambda_d^*$.

The third comparator 16 outputs the corresponding current error to the current control unit 17 by comparing the electric current $i_{ds}^*$ for the reference flux generated and outputted according to the outputted flux reference value $\lambda_d^*$ and current $i_{ds}$ for real flux outputted to the coordinate conversion unit 20. Then, the current control unit 17 generates the voltage $V_{ds}^*$ for reference flux and voltage $V_{qs}^*$ for reference torque, which are respectively D-axis voltage and Q-axis voltage by receiving the current errors outputted from the second comparator 13 and third comparator 16 and outputs the voltages to the three phase voltage generation unit 15.

Here, a formula for yielding the voltage $V_{ds}^*$ for reference flux and voltage $V_{qs}^*$ for reference torque is as follows:

$$V_d = R_s i_d + L_d \frac{di_d}{dt} - \omega_e L_q i_q \qquad \text{Formula 1}$$

$$V_q = R_s i_q + L_d \frac{di_q}{dt} - \omega_e L_d i_d$$

Here, $V_d$, $V_q$ are respectively components of D-axis and Q-axis of voltage, $i_d$, $i_q$ are respectively components of the D-axis and Q-axis of current, $R_s$ is resistance of stator side and $L_d$, $L_q$ are inductances of the D-axis and Q-axis.

Then, the three phase voltage generation unit 18 generates three phase voltages Vas, Vbs and Vcs of the fixed coordinate system using the voltage $V_{ds}^*$ for reference flux, voltage $V_{qs}^*$ for reference torque and the real position angle of the rotor θ from the integrator 22 and applies the voltages into the inverter unit 19 and the inverter unit 19 applying the three phase voltages Vas, Vbs and Vcs into the synchronous reluctance motor 20.

At this time, the rotor position detection unit 21 for detecting the rotor position of the synchronous reluctance motor 20 outputs the real rotation speed of the detected motor into the first comparator 11 and the integrator 22. Then, the integrator 22 yields the position angle of the rotor (θ) corresponding to the real position of the rotor by integrating the real speed and outputs the angle into the coordinate conversion unit 23 and three phase voltage generation units 18.

Therefore, the conventional synchronous reluctance motor controls rotation speed of the motor by repeatedly performing the above process.

However, the conventional apparatus with the above operation, includes a torque ripple due to harmonic wave components included in the detected fundamental wave of current frequency, switching dead time and the like and accordingly, harmonic wave components are included in the induced voltage. Therefore, a ripple is generated in an estimated-calculated rotation speed and accordingly, precise speed control was not possible. Also, it was difficult to handle the apparatus by using an encoder and hall-sensor of the rotor position detection unit.

Also, the conventional apparatus for controlling rotation speed of a synchronous reluctance motor has problems that the cost increases due to using a costly rotor position detection unit and low speed control can not be smoothly done in spite of excellent high speed control.

SUMMARY OF THE INVENTION

Therefore, the object of the present invention is to control a low speed area and high speed area separately to maintain precision of speed control according to variation of load in sensorless speed control for detecting rotor position of a synchronous reluctance motor.

Another object of the present invention is to provide an apparatus for controlling rotation speed of a synchronous reluctance motor capable of accurately controlling rotation speed of a motor where detection of a rotor position such as in a compressor in a refrigerator and air conditioner is difficult by enabling linear control of the inductance variation according to current change using magnetic modeling of the motor.

To achieve these and other advantages in accordance with the purpose of the present invention, as embodied and broadly described herein, there is provided an apparatus for controlling rotation speed of a synchronous reluctance motor, including a first comparator for outputting speed error after comparing a speed reference value and real rotor speed value of a synchronous motor, a speed control unit for outputting electric current for reference torque after performing PI control for compensating the outputted speed error, a second comparator for outputting current error after comparing the outputted electric current for reference torque and electric current for real torque, a flux reference generation unit for generating and outputting flux reference value, a third comparator for outputting flux error after receiving the above outputted flux reference value and comparing the flux reference value and real flux value, a flux control unit for outputting voltage for reference flux of the synchronous coordinate system after performing PI control receiving the above outputted flux error, a current control unit for generating and outputting voltage for reference torque after receiving the current error outputted from the second comparator, a synchronization/fixed coordinate conversion unit for receiving the above voltage for reference flux, voltage for reference torque and position angle of the rotor showing the real position of a rotor estimated in the high speed and low speed areas of the synchronous reluctance motor, converting the two voltages in the synchronous coordinate system into two voltages in the fixed coordinate system and outputting the voltages, a three phase voltage generation unit for converting the outputted two voltages of the fixed coordinate system into three phase voltages and outputting the voltages, an inverter unit for inverting the outputted three phase voltages and then outputting a three phase electric currents for driving the synchronous reluctance motor, a synchronous reluctance motor which is driven by being received the outputted three phase currents, a fixed/synchronization coordinate conversion unit for detecting two phase currents among the three phase currents outputted to the synchronous reluctance motor and then outputting the currents to the second and third comparators and a flux observer, the flux observer for receiving the outputted two phase currents and the two voltages of the fixed coordinate system outputted from the synchronization/fixed coordinate conversion unit and then outputting the corresponding flux, a position estimation unit for estimating the position angle of the rotor for high speed control of the motor and rotation speed of the rotor using the outputted flux, a low speed control unit for receiving the position angle of the rotor and rotation speed, and then estimating the position angle of the rotor for low speed control of the motor and outputting the angle to the synchronization/fixed coordinate conversion unit and a transient state stabilization unit for stabilizing a transient state which is generated according to the low speed control and speed control algorithm.

The foregoing and other, features, aspects and advantages of the present invention will become more apparent from the following detailed description when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, preferred embodiments of an apparatus for controlling rotation speed of a synchronous reluctance motor, capable of controlling a low speed area and high speed area separately to maintain precision of speed control according to variation of load without using a hall sensor or encoder for detecting speed and position of a synchronous reluctance motor and accurately controlling rotation speed of a motor where detection of a rotor position such as in a compressor in a refrigerator and air conditioner is difficult by enabling linear control of the inductance variation according to current change will be described in detail with reference to FIG. 2.

Figure 1:
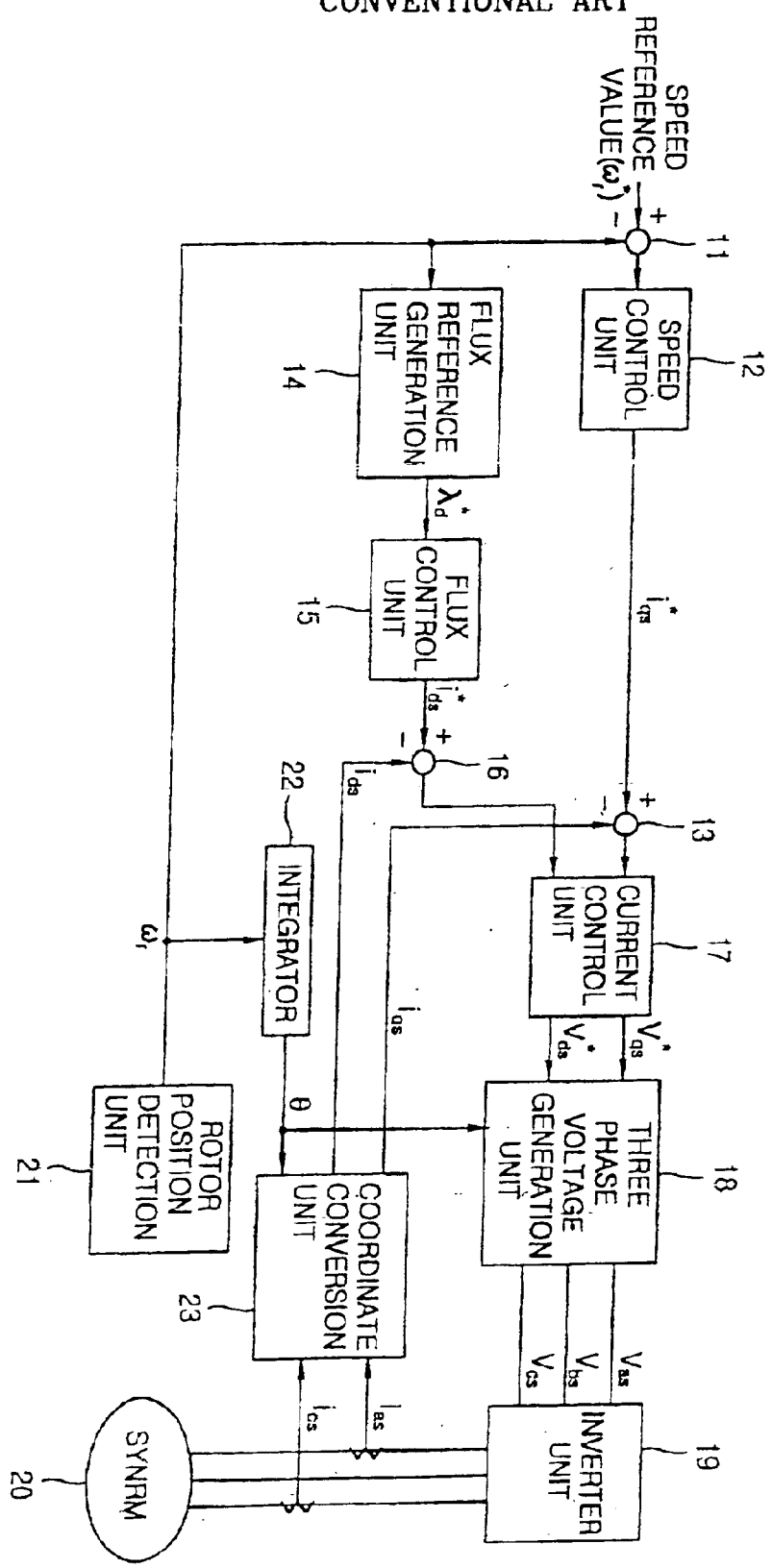
FIG. 1 is a block diagram showing structure of a conventional apparatus for controlling rotation speed of a synchronous reluctance motor.
Figure 2:
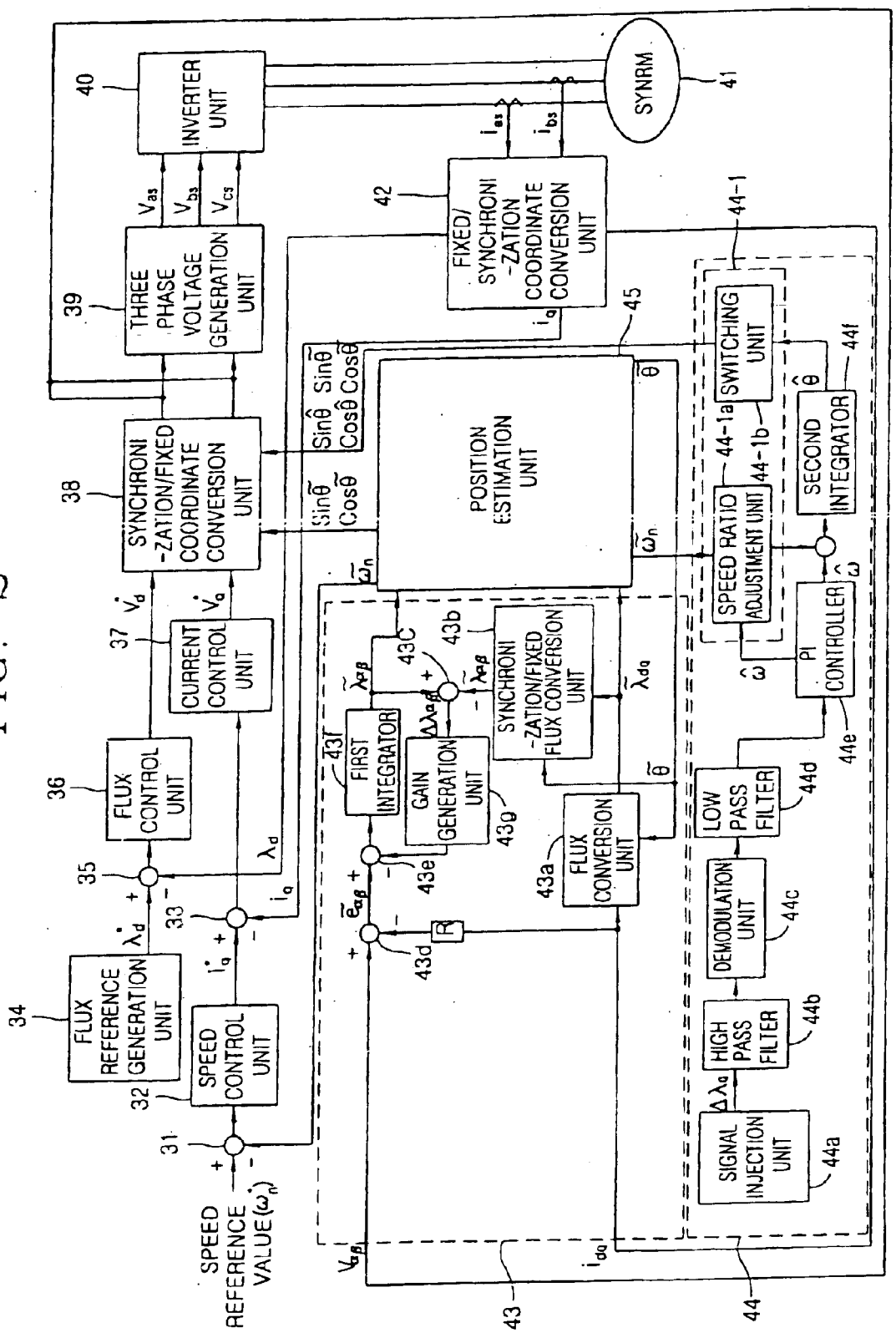
FIG. 2 is a block diagram showing structure of a synchronous reluctance motor in accordance with the present invention.

FIG. 2 is a block diagram showing structure of a synchronous reluctance motor in accordance with the present invention.

As shown in the drawing, the apparatus for controlling rotation speed of a synchronous reluctance motor in accordance with the present invention includes a first comparator 31 for outputting speed error after comparing a speed reference value and real rotor speed value of a synchronous motor, a speed control unit 32 for outputting electric current for reference torque after performing PI control for compensating the outputted speed error, a second comparator 33 for outputting current error after comparing the outputted electric current for reference torque and electric current for real torque, a flux reference generation unit 34 for generating and outputting flux reference value, a third comparator 35 for outputting flux error after receiving the above outputted flux reference value and comparing the flux reference value and real flux value, a flux control unit 36 for outputting voltage for reference flux of the synchronous coordinate system after performing PI control by receiving the above outputted flux error, a current control unit 37 for generating and outputting voltage for reference torque by receiving the current error outputted from the second comparator 33, a synchronization/fixed coordinate conversion unit 38 for receiving the above voltage for reference flux, voltage for reference torque and position angle of the rotor showing the real position of a rotor estimated in the high speed and low speed areas of the synchronous reluctance motor, converting the two voltages in the synchronous coordinate system into two voltages in the fixed coordinate system and then outputting the voltages, a three phase voltage generation unit 39 for converting the outputted two voltages of the fixed coordinate system into three phase voltages and outputting the voltages, an inverter unit 40 for inverting the outputted three phase voltages and then outputting a three phase electric currents for driving the synchronous reluctance motor, a synchronous reluctance motor 41 which is driven by being received the outputted three phase currents, a fixed/synchronization coordinate conversion unit 42 for detecting two phase currents among the three phase currents outputted to the synchronous reluctance motor 41 and then outputting the currents to the second and third comparators 33 and 35 and a flux observer 43, the flux observer 43 receiving the outputted two phase currents and the two voltages of the fixed coordinate system outputted from the synchronization/fixed coordinate conversion unit 38, for outputting the corresponding flux, a position estimation unit 45 for estimating the position angle of the rotor for high speed control of the motor and rotation speed of the rotor using the outputted flux, a low speed control unit 44 receiving the position angle of the rotor and rotation speed, for estimating the position angle of the rotor for low speed control of the motor and outputting the angle to the synchronization/fixed coordinate conversion unit 38 and a transient state stabilization unit 44-1 for stabilizing a transient state which is generated according to the low speed control and speed control algorithm.

Here, the flux observer 43 includes a flux conversion unit 43a receiving the two phase currents $i_{dq}$ outputted from the fixed/synchronization coordinate conversion unit 42, for outputting the estimated flux $\lambda_{dq}$ and $\lambda_q$ according to the synchronous coordinate system, a synchronization/fixed flux conversion unit 43b for converting the estimated flux $\lambda_d$ and $\lambda_q$ and according to the synchronization coordination system into an estimated flux $\lambda_\alpha$ and $\lambda_\beta$ in the fixed coordinate system using the position angle of the rotor θ which is position information outputted from the position estimation unit 45 for high speed control and outputting the flux value, a fourth comparator unit 43d for comparing the voltage $V_{\alpha\beta}$ of the fixed coordinate system outputted from the synchronization/fixed coordinate conversion unit 38 and the voltage corresponding to a multiplied value of the two phase currents $i_{dq}$ and resistance R at the stator side and outputting the corresponding voltage error, that is, an induced voltage $e_{\alpha\beta}$, a first integrator 43f for yielding the real flux $\lambda_\alpha$ and $\lambda_\beta$ and outputting the flux after integrating the outputted induced voltage $e_{\alpha\beta}$, a sixth comparator unit 43c for yielding difference between the estimated flux $\lambda_\alpha$ and $\lambda_\beta$ of the fixed coordinate system outputted from the synchronization/fixed flux conversion unit 43b and the real flux $\lambda_\alpha$ and $\lambda_\beta$ outputted from the first integrator 43f and outputting the difference, a gain generation unit 43g for generating and outputting a gain value to reduce the difference between the outputted two fluxes, that is, the flux error $\alpha\lambda_{\alpha\beta}$ and a position estimation unit 45 receiving the real flux $\lambda_\alpha$ and $\lambda_\beta$ outputted form the first integrator 43f and the estimated flux $\lambda_d$ and $\lambda_q$ outputted from the flux conversion unit 43a, for yielding the position angle of the rotor θ for estimating the rotor position of the synchronous reluctance motor 41 and outputting the angle.

Also, the low speed control unit 44 includes a signal injection unit 44a for inputting a predetermined signal to a flux of a D-axis and obtaining the difference $\Delta\lambda_q$ between the flux value of a Q-axis which is finally observed in the synchronous reluctance motor and flux value of the Q-axis which was initially estimated, in the low speed area of the synchronous reluctance motor or in an initial driving; a high pass filter 44b for performing filtering to remove signals of the direct current DC component among signals outputted from the signal injection unit 44a and outputting the resultant; a demodulation unit 44c for receiving, demodulating the resultant and outputting the signal of the DC component; a low pass filter 44d for performing filtering to generate a signal of complete DC component, by removing erroneous components among the signals of the DC component and outputting the signal of the DC component; a PI control unit 44e for performing PI control of the signal of the DC component and obtaining speed information according to low speed control of a motor; a second integrator 44f for performing integration by receiving the speed information and obtaining position information according to the low speed control of the motor; and a switching unit 44-1b for receiving the position information and outputting the information to the synchronization/fixed coordinate conversion unit 38.

Also, the transient state stabilization unit 44-1 includes a speed ratio adjustment unit 44-1a for comparing the rotation speed $\omega_n$ of the rotor which was estimated in the position estimation unit 45 in case of controlling the motor at high speed and outputted and the rotation speed $\hat{\omega}$ of the rotor which was estimated and outputted to the PI control unit 44e in case of controlling the motor at low speed, in gear controlling of the motor, determining whether the motor is controlled at high or low speed, and stabilizing a transient state which is generated in the motor by having an overlapping region in case of converting from the high speed area to low speed area or from the low speed area to high speed area; a second integrator 44f for outputting the speed information which was inputted from the speed ratio adjustment unit 44-1a; and a switching unit 44-1b for switching to control the motor at low or high speed by receiving the speed information and then outputting the speed information sin $\hat{\theta}$, cos $\hat{\theta}$ according to the low speed control or the speed information sin θ, cos θ according to the high speed control respectively to the synchronization/fixed coordinate conversion unit 38.

The operation of the apparatus for controlling rotation speed of a synchronous reluctance motor in accordance with the present invention with the above composition will be described in detail.

First, the first comparator 31 compares the speed reference value $\omega_n^*$ and real rotor speed value $\omega_n$ detected in the position estimation unit 45 and outputs speed error into the speed control unit 32 and the speed control unit 32 outputs electric current $i_q^*$ for reference torque after performing PI control for compensating the outputted speed error. Then, the second comparator unit 33 outputs current error to the current control unit 37 after comparing the outputted electric current $i_q^*$ for reference torque outputted from the speed control unit 32 and electric current $i_q$ for real torque outputted from the fixed/synchronization coordinate conversion unit 42. The current control unit 37 generates and outputs voltage $V_{qs}^*$ for reference torque, which is a Q-axis voltage into the synchronization/fixed coordinate conversion unit 38, receiving the current error outputted from the second comparator 33.

On the other hand, the flux reference generation unit 34 generates and outputs the flux reference value $\lambda_d^*$ into the third comparator 35 and the third comparator 35 outputs flux error into the flux control unit 36 after comparing the flux reference value $\lambda_d^*$ and real flux value outputted from the fixed/synchronization coordinate conversion unit 42. Then, the flux control unit 36 outputs voltage $V_{ds}^*$ for reference flux, which is a D-axis voltage after performing PI control by receiving the above outputted flux error.

Later, the synchronization/fixed coordinate conversion unit 38 receives a sine value and cosine value to the position angle of the rotor $\theta$ and $\hat{\theta}$ showing the voltage $V_d^*$ for reference flux, voltage $V_q^*$ for reference torque and the real position of the rotor estimated in the high speed and low speed areas, converts the two voltages in the synchronous coordinate system into two voltages $V_d^*$ and $V_q^*$ in the fixed coordinate system and outputs the voltages into the three phase voltage generation unit 39.

Later, the three phase voltage generation unit 39 applies the three phase voltages Vas, Vbs and Vcs into the inverter unit 40 and the inverter unit 40 inverts the outputted three phase voltages Vas, Vbs and Vcs, applies the three phase electric currents for driving motor into the synchronous reluctance motor 41 and drives the motor. The fixed/synchronization coordinate conversion unit 42 detects two phase currents $i_{dq}$ among the applied three phase current and then outputs the currents to the second and third comparators units 33 and 35 and the flux conversion unit 43a.

Then, the process that synchronous reluctance motor 41 performs speed control by estimating the rotor position of the synchronous reluctance motor 41 in high speed or low speed control will be described as follows.

First, the flux observer 43 for performing high speed control of the synchronous reluctance motor 41 will be described as follows.

The flux conversion unit 43a receives the two phase currents $i_{dq}$ outputted from the fixed/synchronization coordinate conversion unit 42 and outputs the estimated flux $\lambda_d$ and $\lambda_q$ according to the synchronous coordinate system into the position estimation unit 45. At this time, FIG. 3 is a characteristic graph showing variation of flux which is varied in accordance with variation of current to yield the estimated flux $\lambda_d$ and $\lambda_q$.

Figure 3:
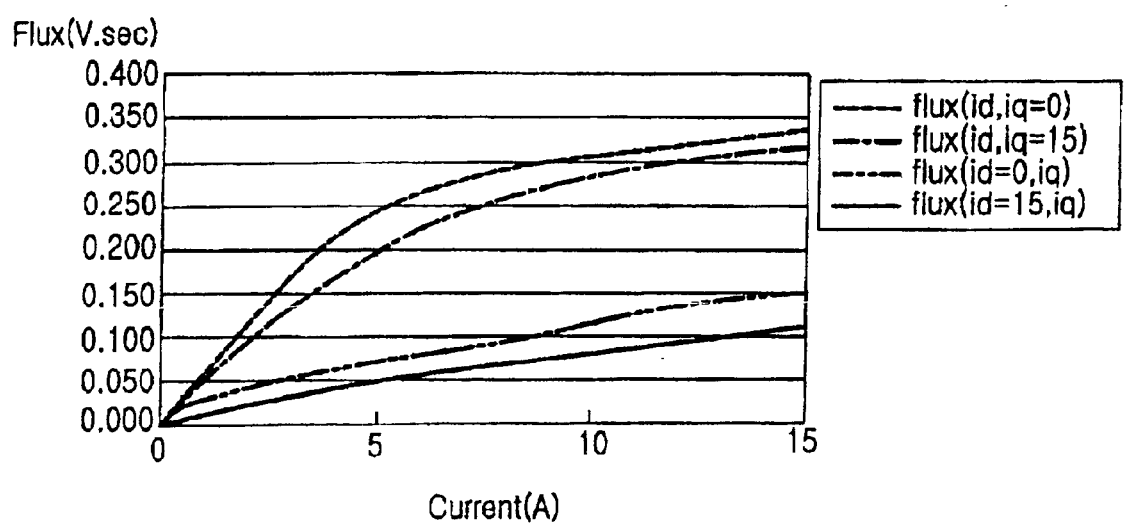
FIG. 3 is a characteristic graph which illustrates variation of flux which is varied in accordance with variation of current applied into a synchronous reluctance motor.

FIG. 3 is a characteristic graph which illustrates variation of flux which is varied in accordance with variation of current applied into a synchronous reluctance motor and the graph is used to form a lookup table with the flux value measured according to the variation amount of two currents.

Later, the synchronization/fixed flux conversion unit 43b converts the estimated flux $\lambda_{dq}$ and $\lambda_d$ according to the synchronization coordination system into an estimated flux $\lambda_\alpha$ and $\lambda_\beta$ in the fixed coordinate system using the position angle of the rotor position $\theta$ which is position information outputted from the position estimation unit 45 and outputs the flux value into the sixth comparator unit 43c.

On the other hand, the first comparator unit 43d for comparing the voltage $V_{\alpha\beta}$ of the fixed coordinate system outputted from the synchronization/fixed coordinate conversion unit 38 and the voltage corresponding to the multiplied value of the two phase currents $i_{dq}$ and resistance R at the stator side and outputting the corresponding voltage error, that is, an induced voltage $e_{\alpha\beta}$ into the first integrator 43f and the first integrator 43f yields the real flux $\lambda_\alpha$ and $\lambda_\beta$ and outputting the flux after integrating the outputted induced voltage $e_{\alpha\beta}$. Then, the sixth comparator 43c unit yields difference between the estimated flux $\hat{\lambda}_\alpha$ and $\hat{\lambda}_\beta$ of the fixed coordinate system outputted from the synchronization/fixed flux conversion unit 43b and the real flux $\lambda_\alpha$ and $\hat{\lambda}_\beta$ outputted from the first integrator 43f and outputs the difference into the gain generation unit 43g and the gain generation unit 43g for generating and outputs a gain value to reduce the difference between the outputted two fluxes, that is, the flux error $\Delta\lambda_{\alpha\beta}$ into the fifth comparator unit 43e Later, the position estimation unit 45 receives the real flux $\lambda_\alpha$ and $\lambda_\beta$ and the estimated flux $\lambda_d$ and $\lambda_q$ and yields the position angle of the rotor $\theta$ for estimating the rotor position of the synchronous reluctance motor 41 and outputs the corresponding sine value and cosine value into the synchronization/fixed coordinate conversion unit 38, thus to perform high speed control of the synchronous reluctance motor. to perform high speed control of the synchronous reluctance motor.

At this time, a formula for obtaining the sine value and cosine value corresponding to the position angle of the rotor $\theta$ using the real flux $\lambda_\alpha$ and $\lambda_\beta$ and estimated flux $\lambda_d$ and $\lambda_q$ is as follows.

$$\sin\tilde{\theta} = \frac{\hat{\lambda}_\alpha\tilde{\lambda}_d - \hat{\lambda}_\beta\tilde{\lambda}_q}{\lambda^2}, \cos\tilde{\theta} = \frac{\hat{\lambda}_\alpha\tilde{\lambda}_d + \hat{\lambda}_\beta\tilde{\lambda}_q}{\lambda^2} \quad \text{Formula 2}$$

Here, $\theta$ designates the rotation angle of the estimated rotor, $\lambda_d$ and $\lambda_q$ designates the flux estimated according to the synchronous coordinate system, $\lambda_\alpha$ and $\lambda_\beta$ designates the flux measured according to the fixed coordinate system, dq designates the signal in the synchronous coordinate system and $\alpha\beta$ designates the signal in the fixed coordinate system, respectively.

Then, the operation of the low speed control unit 44 for performing low speed control of the synchronous reluctance motor 41 will be described as follows.

Since the voltage component has a relatively small value in the low speed region, a voltage error such as dead-time and the like is occurred. Therefore, there occurs a problem in estimating the position only by high speed control of the motor. Therefore, to solve the above problem, a position estimating loop using signal input in the low speed region of the motor is used.

In the low speed region of the motor or in case of initially driving the motor, the signal injection unit 44a obtains difference value $\Delta\lambda_q$ between the flux value of the Q-axis, which is finally observed in the synchronous reluctance motor and the flux value which was initially estimated by inputting a predetermined signal into the flux of D-axis. The predetermined signal is a preference value which was yielded through experiments and in case there is no difference value $\Delta\lambda_q$, that is, the difference value between the observed flux value of the Q-axis and the estimated flux value of the Q-axis is "0", it means that there is no error in the low speed control of the motor.

However, when the difference value is occurred, a position angle of the rotor θ̂ which is a position component appropriate for low speed control through a series of control processes to compensate the difference.

Then, the high pass filter 44b performs filtering to remove signals of the DC component among the signals outputted from the signal injection unit 44a and outputs the resultant value to the demodulation unit 44c. The demodulation unit 44c receives the resultant value, performs demodulation and outputs the signal of the DC component again. The low pass filter 44d removes erroneous components, performs filtering to generate a signal of a complete DC component and outputs the signal to the PI control unit 44e. Then, the PI control unit 44e performs PI control about the generated signal of the DC component and obtains an estimated speed ω̂ which is speed information according to low speed control of the motor. The second integrator 44f receives the estimated speed ω̂ and performs integration and then obtains an estimated position angle of the rotor θ which is position information according to low speed control of the motor. The estimated position angle of the rotor θ is outputted to the synchronization/fixed coordinate conversion unit 38 through a switching unit 44-1b which will be described in the following paragraphs.

As a result, the low speed control unit 44 performs stable speed controlling at low speed by having the difference of flux value of Q-axis as '0', in case of a low speed region of the motor and initial driving of the motor.

Then, the operation of the transient state stabilization unit 44-1 for preventing the state that the increased amount of the voltage/current applied into the whole system of the motor is rapidly increased and stably performing high speed or low speed gear controlling of the motor, when the synchronous reluctance motor 41 is converted from the low speed region to high speed region or from the high speed region to low speed region, that is, when the motor is gear controlled will be described as follows.

First, in case of gear controlling of the motor speed, the speed ratio adjustment unit 44-1a compares the rotation speed $\omega_n$ of the rotor, which is outputted from the position estimating unit 45 by being estimated in case of high speed control and the rotation speed ω̂ of the rotor, which is outputted to the PI control unit 44e by being estimated in case of low speed control and determines whether low speed or high speed control will be performed. Also, the transient state stabilization unit 44-1 stabilizes transient state generated in the motor, by having the overlapped region, in converting from the low speed region to high speed region or from the high speed region to low speed region.

The second integrator 44f integrates the speed information which is inputted from the speed ratio adjustment unit 44-1a and outputs to the switching unit 44-1b. The switching unit 44-1b receives the speed information, performs switching for low or high speed controlling of the motor and outputs the speed information sin θ, cos θ according to low speed control and the speed information sin θ, cos θ according to the high speed control respectively to the synchronization/fixed coordinate conversion unit 38.

As described above in detail, the synchronous reluctance motor in accordance with the present invention controls rotation speed of the rotor without a position detection sensor of the motor by separating the low speed area and high speed area to maintain accuracy of the speed control according to variation of the load.

Also, the apparatus for controlling rotation speed of the synchronous reluctance motor in accordance with the present invention controls the motor in the high speed area or low speed area, stabilizes the transient state generated in the process that the motor is converted from the low speed area to the high speed area and shows stable speed control performance, thus to perform more precise speed control.

Also, the present invention can control the rotation speed of the motor at a position where it is difficult to detect the rotor such as a compressor of a refrigerator and air conditioner by enabling linear control of the inductance which varies according to current variation using a magnetic modeling.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for controlling rotation speed of a synchronous reluctance motor, comprising:

a first comparator for outputting speed error after comparing a speed reference value and real rotor speed value of the synchronous reluctance motor;

a speed control unit for outputting electric current for reference torque after performing PI control for compensating the outputted speed error;

a second comparator for outputting current error after comparing the outputted electric current for reference torque and electric current for real torque;

a flux reference generation unit for generating and outputting flux reference value;

a third comparator for outputting flux error after receiving the outputted flux reference value and comparing the flux reference value and real flux value;

a flux control unit for outputting voltage for reference flux of the synchronous coordinate system after performing PI control receiving the outputted flux error;

a current control unit for generating and outputting voltage for reference torque receiving the current error outputted from the second comparator;

a synchronization/fixed coordinate conversion unit which receives the voltage for reference flux, voltage for reference torque and position angle of the rotor showing the real position of a rotor estimated in the high speed and low speed areas of the synchronous reluctance motor, converts the two voltages in the synchronous coordinate system into two voltages in the fixed coordinate system and output the voltages;

a three phase voltage generation unit for converting the outputted two voltages of the fixed coordinate system into three phase voltages and outputting the voltages;

an inverter unit for inverting the outputted three phase voltages and then outputting three phase electric currents for driving the synchronous reluctance motor;

the synchronous reluctance motor being driven by the outputted three phase currents;

a fixed/synchronization coordinate conversion unit for detecting two phase currents among the three phase currents outputted to the synchronous reluctance motor and then outputting the currents to the second and third comparators and a flux observer;

the flux observer receiving the outputted two phase currents and the two voltages of the fixed coordinate system outputted from the synchronization/fixed coordinate conversion unit, for outputting the corresponding flux;

a position estimation unit for estimating the position angle of the rotor for high speed control of the motor and rotation speed of the rotor using the outputted flux;

a low speed control unit receiving the rotation speed, for estimating the rotation speed of the rotor for low speed control of the motor and outputting the angle to the synchronization/fixed coordinate conversion unit; and a transient state stabilization unit for stabilizing a transient state which is generated according to the low speed control and a speed control algorithm.

2. The apparatus of claim 1, wherein the flux observer includes:

a flux conversion unit receiving the two phase currents outputted from the fixed/synchronization coordinate conversion unit, for outputting the estimated flux according to the synchronous coordinate system;

a fixed/synchronization flux conversion unit for converting the estimated flux according to the synchronization coordination system into an estimated flux in the fixed coordinate system using the position angle of the rotor which is position information outputted from the position estimation unit for high speed control and outputting the flux value;

a first comparator unit for comparing the voltage of the fixed coordinate system outputted from the synchronization/fixed coordinate conversion unit and the voltage corresponding to a multiplied value of the two phase currents and resistance at the stator side and outputting the corresponding voltage error, that is, an induced voltage;

a first integrator for yielding the real flux and outputting the flux after integrating the outputted induced voltage;

a sixth comparator unit for yielding difference between the estimated flux of the fixed coordinate system outputted from the synchronization/fixed flux conversion unit and the real flux outputted from the first integrator and outputting the difference;

a gain generation unit for generating and outputting a gain value to reduce the difference between the outputted two fluxes, that is, the flux error; and a position estimation unit receiving the real flux outputted from the first integrator and the estimated flux outputted from the flux conversion unit, for yielding the position angle of the rotor for estimating the rotor position of the synchronous reluctance motor and outputting the angle.

3. The apparatus of claim 1, wherein the flux observer yields respective fluxes according to the voltage applied to the synchronous reluctance motor the electric current detected from the synchronous reluctance motor and outputting the fluxes to the position estimation unit.

4. The apparatus of claim 1, wherein the low speed control unit includes:

a signal injection unit for obtaining difference between the flux value of Q-axis which is observed finally in the synchronous reluctance motor by inputting a predetermined signal into the D-axis, in the low speed region of the motor or in initial driving;

a high pass filter for filtering to remove signals of DC components among the signals outputted from the signal injection unit and outputting the resultant value;

a demodulation unit for performing demodulation by receiving the resultant value and yielding the signal of the DC component again;

a low pass filter for performing filtering by removing erroneous components among the signals of the DC components to generate a signal of a complete DC component and outputting the signal of the DC component;

a PI control unit for performing PI controlling about the signal of the DC component and then obtaining speed information according to low speed control of the motor;

a second integrator for performing integration by receiving the speed information and obtaining the position information according to a low speed control of the motor; and a switching unit for receiving the position information and outputting into the synchronization/fixed conversion unit.

5. The apparatus of claim 1, wherein the transient state stabilization unit includes:

a speed rate adjusting unit for comparing the rotation speed of the rotor, which is outputted from the position estimating unit by being estimated in case of high speed control and the rotation speed of the rotor, which is outputted to the PI control unit by being estimated in case of low speed control, determining whether low speed or high speed control will be performed in gear controlling motor speed, and stabilizing a transient state generated in the motor, by having an overlapped region, in converting from the low speed region to high speed region or from the high speed region to low speed region;

a second integrator for integrating and outputting speed information which is inputted from the speed ratio adjustment unit; and a switching unit for performing switching by receiving the speed information to control the motor at low or high speed and outputting the speed information according to low speed control or high speed control to the synchronization/fixed coordinate conversion unit respectively.

6. The apparatus of claim 1, wherein the transient state stabilization unit stabilizes transient state generated since the applied signal for speed control in the low speed area in the process that the speed control algorithm is converted from the low speed area to the high speed area in the synchronous reluctance motor.

7. The apparatus of claim 1, wherein the position estimation unit receives an input of the fluxes in the observed low speed area and estimated high speed area and outputs the position angle of the rotor according to the following formula:

$$\sin\tilde{\theta} = \frac{\lambda_\alpha \tilde{\lambda}_d - \lambda_\beta \tilde{\lambda}_q}{\lambda^2}, \cos\tilde{\theta} = \frac{\lambda_\alpha \tilde{\lambda}_d + \lambda_\beta \tilde{\lambda}_q}{\lambda^2}$$

wherein, θ designates a rotation estimated angle of the rotor, $\lambda_d$ and $\lambda_q$ designates a flux estimated according to the synchronous coordinate system, $\lambda_\alpha$ and $\lambda_\beta$ designates a flux observed according to the fixed coordinate system, dq designates a rotation coordinate signal and αβ designates a fixed coordinate signal.

8. The apparatus of claim 2, wherein the flux conversion unit generates an estimated flux according to the synchronous coordinate system by forming a lookup table with the flux value measured according to the variation amount of two currents outputted form the fixed/synchronization coordinate conversion unit.

9. An apparatus for controlling rotation speed of a synchronous reluctance motor, comprising:

a position estimation unit for performing control of rotation speed of the synchronous reluctance motor by estimating the position angle of the rotor and rotation speed of the rotor according to the low or high speed areas of the synchronous reluctance motor; and a low speed control unit including:
    a signal injection unit for inputting a predetermined signal to a flux of a D-axis and obtaining the different between the flux value of a Q-axis which is finally observed in the synchronous reluctance motor and flux value of the Q-axis which was initially estimated, in the low speed area of the motor or in an initial driving;
    a high pass filter for performing filtering to remove signals of the direct current DC component among signals outputted from the signal injection unit 44a and outputting the resultant;
    a demodulation unit for receiving, demodulating the resultant value and outputting the signal of the DC component;
    a low pass filter for performing filtering to generate a signal of complete DC component, by removing erroneous components among the signals of the DC component and outputting the signal of the DC component;
    a PI control unit for performing PI control of the signal of the DC component and obtaining speed information according to low speed control of the motor;
    a second integrator for performing integration by receiving the speed information and obtaining position information according to the low speed control of the motor; and
    a switching unit for receiving the position information and outputting the information to the synchronization/fixed coordinate conversion unit.

10. The apparatus of claim 9, wherein the position estimation unit receives an input of the fluxes in the observed low speed area and estimated high speed area and outputs the position angle of the rotor according to the following formula:

$$\sin\tilde{\theta} = \frac{\hat{\lambda}_\alpha \tilde{\lambda}_d - \hat{\lambda}_\beta \tilde{\lambda}_q}{\lambda^2}, \cos\tilde{\theta} = \frac{\hat{\lambda}_\alpha \tilde{\lambda}_d + \hat{\lambda}_\beta \tilde{\lambda}_q}{\lambda^2}$$

wherein, θ designates a rotation estimated angle of the rotor, $\lambda_d$ and $\lambda_q$ designates a flux estimated according to the synchronous coordinate system, $\lambda_\alpha$ and $\lambda_\beta$ designates a flux observed according to the fixed coordinate system, dq designates a rotation coordinate signal and αβ designates a fixed coordinate signal.

11. An apparatus for controlling rotation speed of a synchronous reluctance motor, comprising:

a position estimation unit for controlling rotation speed of the motor by estimating rotor position angle of the rotor and rotation speed of a rotor according to the low speed or high speed area of the synchronous reluctance motor; and a transient state stabilization unit including:
    a speed ratio adjustment unit for comparing the rotation speed of the rotor which was estimated in the position estimation unit in case of controlling the motor at high speed and outputted, and the rotation speed of the rotor which was estimated and outputted to a PI control unit in case of controlling the motor at low speed, in gear controlling of the motor, determining whether the motor is controlled at high or low speed, and stabilizing a transient state which is generated in the motor by having an overlapping region in case of converting from the high speed area to low speed area or from the low speed area to high speed area;
    a second integrator for integrating and outputting the speed information which was inputted from the speed ratio adjustment unit; and
    a switching unit for switching to control the motor at low or high speed by receiving the speed information and then outputting the speed information according to the low speed control or the speed information according to the high speed control respectively to the synchronization/fixed coordinate conversion unit.

12. The apparatus of claim 11, wherein the position estimation unit receives an input of the fluxes in the observed low speed area and estimated high speed area and outputs the position angle of the rotor according to the following formula:

$$\sin\tilde{\theta} = \frac{\hat{\lambda}_\alpha \tilde{\lambda}_d - \hat{\lambda}_\beta \tilde{\lambda}_q}{\lambda^2}, \cos\tilde{\theta} = \frac{\hat{\lambda}_\alpha \tilde{\lambda}_d + \hat{\lambda}_\beta \tilde{\lambda}_q}{\lambda^2}$$

wherein, θ designates a rotation estimated angle of the rotor, $\lambda_d$ and $\lambda_q$ designates a flux estimated according to the synchronous coordinate system, $\lambda_\alpha$ and $\lambda_\beta$ designates a flux observed according to the fixed coordinate system, dq designates a rotation coordinate signal and αβ designates a fixed coordinate signal.

13. The apparatus of claim 11, further comprising:
a fixed/synchronization coordinate conversion unit for detecting two phase currents among the three phase currents outputted to the synchronous reluctance motor and then outputting the currents to second and third comparators and a flux observer;

the flux observer receiving the outputted two phase currents and the two voltages of the fixed coordinate system outputted to the synchronous reluctance motor, for outputting the corresponding flux;

a low speed control unit receiving the rotation speed which is estimated from the position estimation unit, for estimating the rotation speed of the rotor for low speed control of the motor and outputting the speed to the synchronization/fixed coordinate conversion unit; and the transient state stabilization unit stabilizing a transient state which is generated according to the low speed control and a speed control algorithm.

14. An apparatus for controlling rotation speed of a synchronous reluctance motor, comprising:

a fixed/synchronization coordinate conversion unit for detecting two phase currents among the three phase currents outputted to synchronous the reluctance motor and then outputting the currents to second and third comparators and a flux observer;

the flux observer receiving the outputted two phase currents and the two voltages of the fixed coordinate system outputted to the synchronous reluctance motor, for outputting the corresponding flux;

a position estimation unit for estimating the position angle of the rotor for high speed control of the synchronous reluctance motor and rotation speed of the rotor using the outputted flux;

a low speed control unit receiving the rotation speed, for estimating the rotation speed of the rotor for low speed control of the synchronous reluctance motor and outputting the angle to the synchronization/fixed coordinate conversion unit; and a transient state stabilization unit for stabilizing a transient state which is generated according to the low speed control and a speed control algorithm, wherein the flex observer includes:

a flux conversion unit receiving the two phase currents outputted from the fixed/synchronization coordinate conversion unit, for outputting the estimated flux according to the synchronous coordinate system;

a fixed/synchronization flux conversion unit for converting the estimated flux according to the synchronization coordination system into an estimated flux value in the fixed coordinate system using the position angle of the rotor which is position information outputted from the position estimation unit for high speed control and outputting the flux value;

a fourth comparator unit for comparing the voltage of the fixed coordinate system outputted from the synchronization/fixed coordinate conversion unit and the voltage corresponding to a multiplied value of the two phase currents and resistance at the stator side and outputting the corresponding voltage error, that is, an induced voltage;

a first integrator for yielding the real flux and outputting the flux after integrating the outputted induced voltage;

a sixth comparator unit for yielding difference between the estimated flux of the fixed coordinate system outputted from the synchronization/fixed flux conversion unit and the real flux outputted from the first integrator and outputting the difference;

a gain generation unit for generating and outputting a gain value to reduce the difference between the outputted two fluxes, that is, the flux error; and a position estimation unit receiving the real flux outputted from the first integrator and the estimated flux outputted from the flux conversion unit, for yielding the position angle of the rotor for estimating the rotor position of the synchronous reluctance motor and outputting the angle.

15. The apparatus of claim 14, wherein the low speed control unit includes:

a signal injection unit for inputting a predetermined signal to a flux of a D-axis and obtaining the difference between the flux value of a Q-axis which is finally observed in the synchronous reluctance motor and flux value of the Q-axis which was initially estimated, in the low speed area of the motor or in an initial driving;

a high pass filter for performing filtering to remove signals of the direct current DC component among signals outputted from the signal injection unit 44a and outputting the resultant;

a demodulation unit for receiving, demodulating the resultant value and outputting the signal of the DC component;

a low pass filter for performing filtering to generate a signal of complete DC component, by removing erroneous components among the signals of the DC component and outputting the signal of the DC component;

a PI control unit for performing PI control of the signal of the DC component and obtaining speed information according to low speed control of the motor;

a second integrator for performing integration by receiving the speed information and obtaining position information according to the low speed control of the motor; and a switching unit for receiving the position information and outputting the information to the synchronization/fixed coordinate conversion unit.

16. The apparatus of claim 14, wherein the transient state stabilization unit includes:

a speed ratio adjustment unit for comparing the rotation speed of the rotor which was estimated in the position estimation unit in case of controlling the motor at high speed and outputted, and the rotation speed of the rotor which was estimated and outputted to a PI control unit in case of controlling the motor at low speed, in gear controlling of the motor, determining whether the motor is controlled at high or low speed, and stabilizing a transient state which is generated in the motor by having an overlapping region in case of converting from the high speed area to low speed area or from the low speed area to high speed area;

a second integrator for integrating and outputting the speed information which was inputted from the speed ratio adjustment unit; and a switching unit for switching to control the motor at low or high speed by receiving the speed information and then outputting the speed information according to the low speed control or the speed information according to the high speed control respectively to the synchronization/fixed coordinate conversion unit.

17. The apparatus of claim 14, wherein the transient state stabilization unit stabilizes transient state generated since the applied signal for speed control in the low speed area in the process that the speed control algorithm is converted from the low speed area to the high speed area in the synchronous reluctance motor.

18. The apparatus of claim 14, wherein the position estimation unit receives an input of the fluxes in the observed low speed area and estimated high speed area and outputs the position angle of the rotor according to the following formula:

$$\sin\tilde{\theta} = \frac{\tilde{\lambda}_\alpha \tilde{\lambda}_d - \tilde{\lambda}_\beta \tilde{\lambda}_q}{\lambda^2}, \cos\tilde{\theta} = \frac{\tilde{\lambda}_\alpha \tilde{\lambda}_d + \tilde{\lambda}_\beta \tilde{\lambda}_q}{\lambda^2}$$

wherein, $\theta$ designates a rotation estimated angle of the rotor, $\lambda_d$ and $\lambda_q$ designates a flux estimated according to the synchronous coordinate system, $\lambda_\alpha$ and $\lambda_\beta$ designates a flux observed according to the fixed coordinate system, dq designates a rotation coordinate signal and $\alpha\beta$ designates a fixed coordinate signal.

19. The apparatus of claim 14, wherein the flux conversion unit generates an estimated flux according to the synchronous coordinate system by forming a lookup table with the flux value measured according to the variation amount of two currents outputted form the fixed/synchronization conversion unit.

20. A method for controlling rotation speed of a synchronous reluctance motor, comprising the steps of:

comparing a speed reference value and real rotor speed value of the synchronous reluctance motor and then outputting the corresponding speed error;

performing PI control for compensating the outputted speed error and outputting the corresponding electric current;

receiving the outputted current, generating a voltage for a flux in the synchronous coordinate system and then outputting the voltage;

generating a flux reference value and outputting the value;

comparing the flux reference value and real flux, receiving the outputted flux reference value and then outputting the corresponding flux error;

outputting a voltage for a torque in the synchronous coordinate, system after performing the PI control by receiving the outputted flux error;

converting the two voltages of the synchronous coordinate system into two voltages of the fixed coordinate system by receiving the position angle of the rotor showing the real position of a rotor estimated in the high speed and low speed areas of the synchronous reluctance motor, converts the two voltages in the synchronous coordinate system into two voltages in the fixed coordinate system and output the voltages;

converting the outputted two voltages of the fixed coordinate system into three phase voltages and outputting the voltages;

inverting the outputted three phase voltages and then outputting a three phase electric currents for driving the synchronous reluctance motor;

driving the synchronous reluctance motor by receiving the outputted three phase currents;

detecting two phase currents among the three outputted phase currents;

receiving the outputted two phase currents and the two voltages of the fixed coordinate system and outputting the corresponding flux;

estimating the position angle of the rotor and rotation speed of the rotor for high speed control of the synchronous reluctance motor using the outputted flux;

receiving the rotation speed, estimating the rotation speed of the rotor for low speed control of the synchronous reluctance motor and outputting the rotation speed; and stabilizing a transient state generated according to the low speed control and a speed control algorithm.

21. The method of claim 20, wherein the step of estimating the position angle of the rotor and rotation speed of the rotor for high speed control of the synchronous reluctance motor includes the steps of:

receiving the detected two phase currents and outputting an estimated flux according to the synchronous coordinate system;

converting the estimated flux according to the synchronization coordination system into an estimated flux value in the fixed coordinate system and outputting the flux value;

comparing the voltage of the fixed coordinate system applied to the synchronous reluctance motor and the voltage corresponding to a multiplied value of the two phase currents and resistance at the stator side and outputting the corresponding induced voltage;

yielding and outputting the real flux after integrating the outputted induced voltage;

yielding and outputting difference between the estimated flux of the fixed coordinate system and the real flux;

generating and outputting a gain value to compensate the difference between the outputted two fluxes; and receiving the real flux and the estimated flux, yielding and outputting the position angle of the rotor for estimating the rotor position of the synchronous reluctance motor.

22. The method of claim 20, wherein the step of estimating the position angle of the rotor and rotation speed of the rotor for high speed control of the synchronous reluctance motor includes a step of:

respectively yielding and outputting fluxes according to the voltage applied to the synchronous reluctance motor and the electric current detected from the synchronous reluctance motor.

23. The method of claim 21, the step of receiving the detected two phase currents and outputting the estimated flux according to the synchronous coordinate system further includes a step of:

generating an estimated flux according to the synchronous coordinate system by forming a lookup table with the flux value measured according to the detected variation amount of two phase currents.

* * * * *